W. STEINBACH.
PROPELLER.
APPLICATION FILED APR. 29, 1914.
1,117,103.
Patented Nov. 10, 1914.
2 SHEETS—SHEET 2.
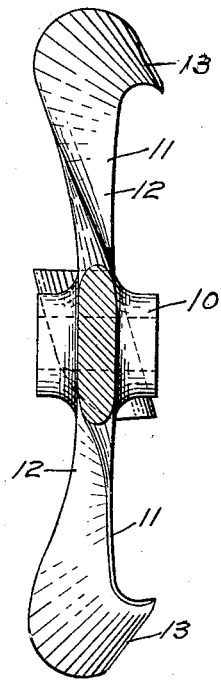
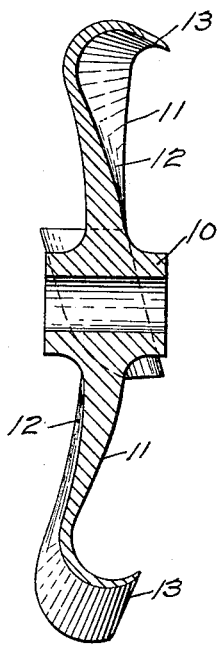
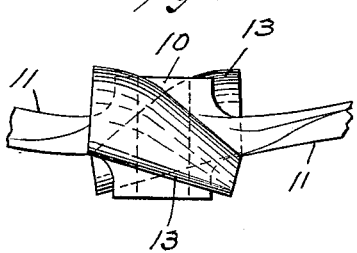
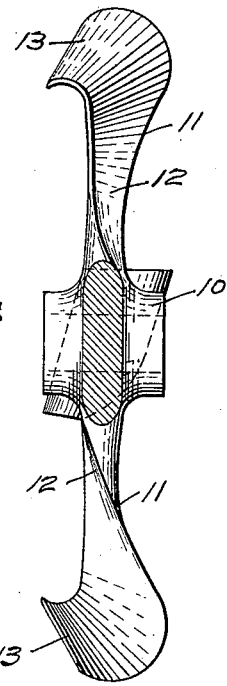
Witnesses:
Inventor
William Steinbach.
By his Attorney

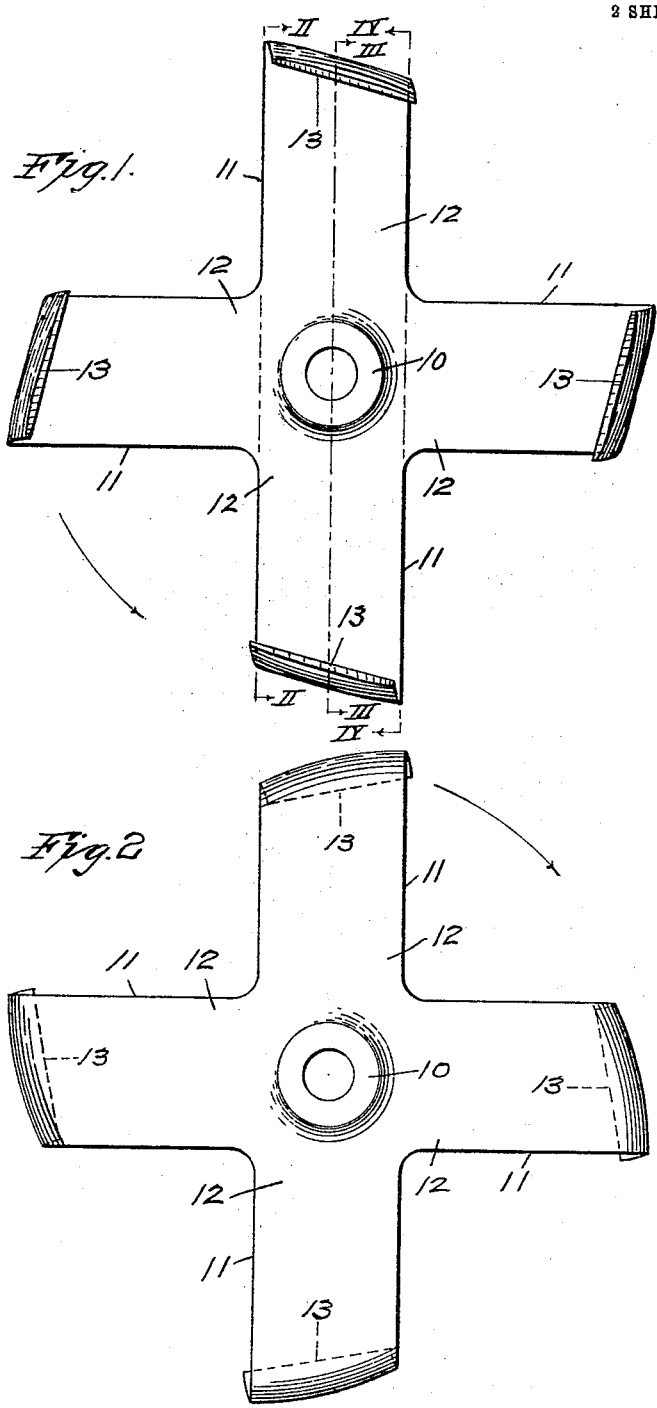

UNITED STATES PATENT OFFICE.

WILLIAM STEINBACH, OF NEW YORK, N. Y.

PROPELLER.

1,117,103.  Specification of Letters Patent.  Patented Nov. 10, 1914.

Application filed April 29, 1914. Serial No. 835,187.

*To all whom it may concern:*

Be it known that I, WILLIAM STEINBACH, a citizen of the United States, and a resident of New York, county and State of New York, have invented a certain new and useful Improvement in Propellers, of which the following is a full, clear, and exact specification.

This invention relates to a class of devices adapted to be used in conjunction with marine and aerial navigating vessels.

My invention has for its object to provide a simple and efficient propeller designed to be employed for driving marine and aerial vessels, and which is constructed with a hub having a number of radially disposed similar blades of compound bore types, each having a spiral member, or arm projecting from a common hub. Overhanging one of the corresponding faces of each of the spiral members is a second member, or curved fin, or wing of the formation of approximately a cone-shape, or funnel-shape, and all of the cone-shaped members are disposed on similar inclines transversely as well as being disposed diagonally with respect to the axial center longitudinally of the hub. These inclined diagonally disposed transverse cone-shaped members taper from the front edge of the blades to the rear edges thereof, and all of the blades are preferably of similar widths throughout their lengths. The blades will thereby revolve in screw-fashion when the propeller is operated, the cone-shaped members receiving in scoop-like manner the water, or the air, during its employment for marine, or aerial navigation so that the working surface of the blades will take the water, or air with a minimum of resistance and will tend to concentrate the pressure thereof during the flow of the agent from the wide ends to the narrow ends of the members. The compound helical cone-shaped blades will therefore serve to force the water, or the air directly astern the vessel for driving it forwardly without material loss of power to the propeller.

A further object of the invention is to form the blades with a graduated, or tapered thickness from the hub to the free ends thereof, and also to form the blades in a helical-shaped ellipsis as viewed transversely so as to combine great strength and durability as well as permitting the blades to be made of material of comparatively light weight as occasion requires.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawings, Figure 1 is a front elevation of one form of propeller embodying my invention. Fig. 2 is a rear elevation of the propeller. Fig. 3 is an edge view, partly in section, taken on the line II—II of Fig. 1. Fig. 4 is a section taken on the line III—III of Fig. 1. Fig. 5 is a section taken on the line IV—IV of Fig. 1, and Fig. 6 is a view, partly fragmentary and partly in detail, looking at the propeller when placed on a longitudinal plane.

The device, or propeller has a hub 10 which may be of any suitable shape and size to adapt it to be secured on the drive shaft of a marine, or aerial navigating vessel. Extending radially from the central part of the periphery of the hub 10 are a number of blades 11 all of which are similarly formed, and while I show in the drawing four of these blades, it will be understood that forms of the propeller may be made wherein a greater or less number of the blades may be used. All of the blades 11 are of compound bore types, and each blade has a spiral member, or arm 12 projecting from the hub 10. The spiral members 12 may be of any desired lengths, and each of these members are formed so that its medial line lengthwise is graduated or tapered in thickness from the hub outwardly thereof. The members 12 are also formed in a helical-shaped ellipsis as viewed transversely so that the side edges thereof will be sharpened for freely cutting the water, or air when the propeller is in use. Furthermore, this formation of the members 12 permits the blades to be made so as to be very strong and durable at the same time permitting the propeller to be made of light weight material when desired.

Overhanging one of the corresponding faces of each of the spiral members 12 is a second member, or curved fin, or wing, as 13. All of the members 13 are preferably alike, and each member is approximately the shape of a cone, or funnel to provide a curved wall which converges, or tapers from a wide end at the front edge of the blade to a narrow end at the opposite edge thereof. As shown, the cone-shaped members 13 are disposed on similar inclines transversely and also diagonally with respect to the working faces of the spiral members 12 of the blades and with relation to the axial center longitudinally of the hub. The member 12 and the member 13 are of the same widths, and each blade is therefore of similar widths throughout its length. When the propeller is in operation the blades will revolve in screw-fashion in a direction shown by the arrows Figs. 1 and 2, the cone-shaped members taking the water, or air in the manner of a scoop so that the agent will be received in the wide ends thereof, concentrating its pressure during its glancing passage over the working surfaces of the blades, and being freely discharged from the narrow ends of the cone-shaped members. The water or air will thus be forced directly astern of the vessel for driving it forwardly without material loss of power. Obviously a maximum efficiency may be obtained by the use of this form of propeller as the resistance thereon will be reduced to a minimum.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In a propeller of the character described, a compound blade of a similar width throughout its length, said blade having a helical member, and an approximately cone-shaped member on the free end thereof, said cone-shaped member overhanging one face of the helical member, and being disposed on an incline relatively to the lengthwise center of the blade.

2. In a propeller of the character described, a compound blade of a similar width throughout its length, said blade having a helical member, and an approximately cone-shaped member on the free end thereof, said cone-shaped member overhanging one face of the helical member, and being disposed diagonally on an incline relatively to the lengthwise center of the blade.

3. In a propeller of the character described, a compound blade of a similar width throughout its length, said blade having a helical member, the thickness of which is tapered lengthwise thereof, and an approximately cone-shaped fin overhanging the working face of the helical member, and being disposed on an incline so that its wide end is toward the front edge of the helical member.

4. In a propeller of the character described, a compound blade of a similar width throughout its length, said blade having a helical member, the thickness of its medial line lengthwise thereof being tapered, and said member being substantially elliptic in shape as viewed transversely, and an approximately cone-shaped fin overhanging the working face of the helical member, and being disposed diagonally on an incline relatively to the lengthwise center of the blade.

This specification signed and witnessed this twenty eighth day of April, A. D. 1914.

WILLIAM STEINBACH.

Witnesses:
ROBT. B. ABBOTT,
M. DERMODY.

---

Copies of this patent may be obtained for five cents each, by addressing the "Commissioner of Patents, Washington, D. C."